US008145905B2

(12) United States Patent
Patwardhan et al.

(10) Patent No.: US 8,145,905 B2
(45) Date of Patent: Mar. 27, 2012

(54) METHOD AND APPARATUS FOR EFFICIENT SUPPORT FOR MULTIPLE AUTHENTICATIONS (75) Inventors: Ravindra Patwardhan, San Diego, CA (US); Fatih Ulupinar, San Diego, CA (US); Jun Wang, La Jolla, CA (US); Lakshminath Reddy Dondeti, San Diego, CA (US); Parag Arun Agashe, San Diego, CA (US); Peerapol Tinnakornsrisuphap, San Diego, CA (US); Raymond Tah-Sheng Hsu, San Diego, CA (US); Vidya Narayanan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1000 days.

(21) Appl. No.: 12/113,860

(22) Filed: May 1, 2008

(65) Prior Publication Data
US 2008/0294897 A1    Nov. 27, 2008

Related U.S. Application Data (60) Provisional application No. 60/916,530, filed on May 7, 2007.

(51) Int. Cl.
*H04L 29/06* (2006.01)
(52) U.S. Cl. ........ 713/168; 713/169; 713/170; 713/171; 726/2; 726/3; 726/4; 726/5; 726/7; 380/255; 380/259; 380/270
(58) Field of Classification Search .......... 380/255–274; 726/1–21, 26–30; 709/223–229; 713/168–171
See application file for complete search history.

(56) References Cited

U.S. PATENT DOCUMENTS

| 7,421,503 | B1* | 9/2008 | Stieglitz et al. | ............... 709/229 |
| 2005/0177733 | A1 | 8/2005 | Stadelmann et al. | |
| 2006/0004643 | A1 | 1/2006 | Stadelmann et al. | |
| 2007/0022476 | A1* | 1/2007 | Bae et al. | ......... 726/15 |
| 2007/0121947 | A1* | 5/2007 | Sood et al. | ..... 380/277 |
| 2007/0217610 | A1* | 9/2007 | Yegani et al. | ................ 380/270 |
| 2008/0060061 | A1* | 3/2008 | Deshpande et al. | ............. 726/5 |

FOREIGN PATENT DOCUMENTS

| EP | 1622335 | 2/2006 |
| KR | 20050109685 A | 11/2005 |

(Continued)

OTHER PUBLICATIONS

Performance Study of Fast BSS Transition using IEEE 802.11r by Bangolae et al; Publisher: ACM; Year: 2006.*

(Continued)

*Primary Examiner* — Taghi Arani
*Assistant Examiner* — Madhuri Herzog
(74) *Attorney, Agent, or Firm* — Won Tae Kim (57) ABSTRACT Disclosed is a method for multiple EAP-based authentications in a wireless communication system. In the method, a first master session key (MSK) is generated in a first EAP-based authentication for a first-type access. A first temporal session key (TSK) is generated from the first master session key (MSK). A second EAP-based authentication is performed, using the first temporal session key (TSK), for a second-type access. First-type access and second-type access are provided after the first and second EAP-based authentications are successfully completed.

48 Claims, 4 Drawing Sheets

FOREIGN PATENT DOCUMENTS

| | | |
|---|---|---|
| RU | 2278477 C2 | 6/2006 |
| RU | 2295200 C2 | 3/2007 |
| WO | WO2004028071 A1 | 4/2004 |
| WO | WO2006017133 | 2/2006 |
| WO | 2006079419 | 8/2006 |
| WO | WO2007004824 | 1/2007 |

OTHER PUBLICATIONS

International Search Report—PCT/US2008/062966, International Searching Authority—Oct. 15, 2008.

Written Opinion—PCT/US2008/062966, International Searching Authority—Oct. 15, 2008.

F. Bersani et al., Net Working Group, Request for Comments: 4764, "The EAP-PSK Protocol: A Pre-Shared Key Extensible Authentication Protocol (EAP) Method", published Jan. 2007, found in Internet: http://tools.ietf.org/html/rfc4764.

H. Haverinen, Ed., et al., Network Working Group, Request for Comments: 4186, "Extensible Authentication Protocol Method for Global System for Mobile Communications (GSM) Subscriber Identity Modules (EAP-SIM)", published Jan. 2006, found in Internet: http://tools.ietf.org/html/rfc4186.

J. Arkko, et al., Network Working Group, Request for Comments: 4187, "Extensible Authentication Protocol Method for 3rd Generation Authentication and Key Agreement (EAP-AKA)", published Jan. 2006, found in Internet: http://tools.ietf.org/html/rfc4187).

V. Dorot, F. Novikov, "Glossary of modern computer lexis", 3rd edition, Saint Petersburg, "BHV-Petersburg", 2004, p. 394.

* cited by examiner

METHOD AND APPARATUS FOR EFFICIENT SUPPORT FOR MULTIPLE AUTHENTICATIONS

CLAIM OF PRIORITY UNDER 35 U.S.C. §119

The present Application for Patent claims priority to Provisional Application No. 60/916,530 entitled "METHOD AND APPARATUS FOR EFFICIENT SUPPORT FOR MULTIPLE AUTHENTICATIONS" filed May 7, 2007, and assigned to the assignee hereof and hereby expressly incorporated by reference herein.

BACKGROUND

1. Field

The present invention relates generally to wireless communications, and more specifically to multiple authentications.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP LTE systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

SUMMARY

An aspect of the present invention may reside in a method for multiple EAP-based authentications in a wireless communication system. In the method, a first master session key (MSK) is generated in a first EAP-based authentication for a first-type access. A first temporal session key (TSK) is generated from the first master session key (MSK). A second EAP-based authentication is performed, using the first temporal session key (TSK), for a second-type access. First-type access and second-type access are provided after the first and second EAP-based authentications are successfully completed.

In more detailed aspects of the invention, the method may further comprise generating a second master session key (MSK) in the second EAP-based authentication.

Also, the method may further comprise generating a second temporal session key (TSK) from the second master session key (MSK). The second temporal session key (TSK) may be used in a third authentication. Alternatively, the method may further comprise using the first temporal session key (TSK) for a third EAP-based authentication if a second master session key (MSK) is not generated in the second EAP-based authentication. The first and second EAP-based authentications may be part of a single session.

In other more detailed aspects of the invention, the method may further comprise generating an indicator message to indicate if the first and second EAP-based authentications are successfully completed. The indicator message may have a value of 1 to indicate successful completion of the first and second EAP-based authentications, and a value of 0 to indicate the first and second EAP-based authentications have not been completed. The indicator message may be a ValidPMKExists flag.

Additionally, the first EAP-based authentication may include an EAP Request/Identity message that includes a first authentication type, and the second EAP-based authentication may include an EAP Request/Identity message that includes a second authentication type. The method may further comprise generating a first domain specific root key (DSRK) in the first EAP-based authentication, generating a second domain specific root key (DSRK) in the second EAP-based authentication, and performing an EAP-based reauthentication of at least one of the first type access or the second type access using at least one of the first DSRK and the second DSRK. The first-type access may be associated with an access terminal (AT), and second-type access may be associated with a user. Alternatively, the first-type access is associated with a particular device, and second-type access is associated with a particular server. Also, the first-type access may comprise access to a radio network, and second-type access may comprise access through an internet service provider (ISP).

Another aspect of the invention may reside in an apparatus for multiple EAP-based authentications operable in a wireless communication system, the apparatus comprising: means for generating a first master session key (MSK) in a first EAP-based authentication for a first-type access, means for generating a first temporal session key (TSK) from the first master session key (MSK), means for performing a second EAP-based authentication, using the first temporal session key (TSK), for a second-type access, and means for providing first-type access and second-type access after the first and second EAP-based authentications are successfully completed.

Yet another aspect of the invention may reside is computer program product comprising computer readable medium comprising code for causing a computer to generate a first master session key (MSK) in a first EAP-based authentication for a first-type access, code for causing a computer to generate a first temporal session key (TSK) from the first master session key (MSK), code for causing a computer to perform a second EAP-based authentication, using the first temporal session key (TSK), for a second-type access, and code for causing a computer to provide first-type access and second-type access after the first and second EAP-based authentications are successfully completed.

Yet another aspect of the invention may reside in an apparatus for multiple EAP-based authentications operable in a wireless communication system, the apparatus comprising a processor, configured to: generate a first master session key (MSK) in a first EAP-based authentication for a first-type access, generate a first temporal session key (TSK) from the first master session key (MSK), perform a second EAP-based authentication, using the first temporal session key (TSK), for a second-type access, provide first-type access and second-type access after the first and second EAP-based authentications are successfully completed, and a memory coupled to the processor for storing data.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM☐, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Figure 1:
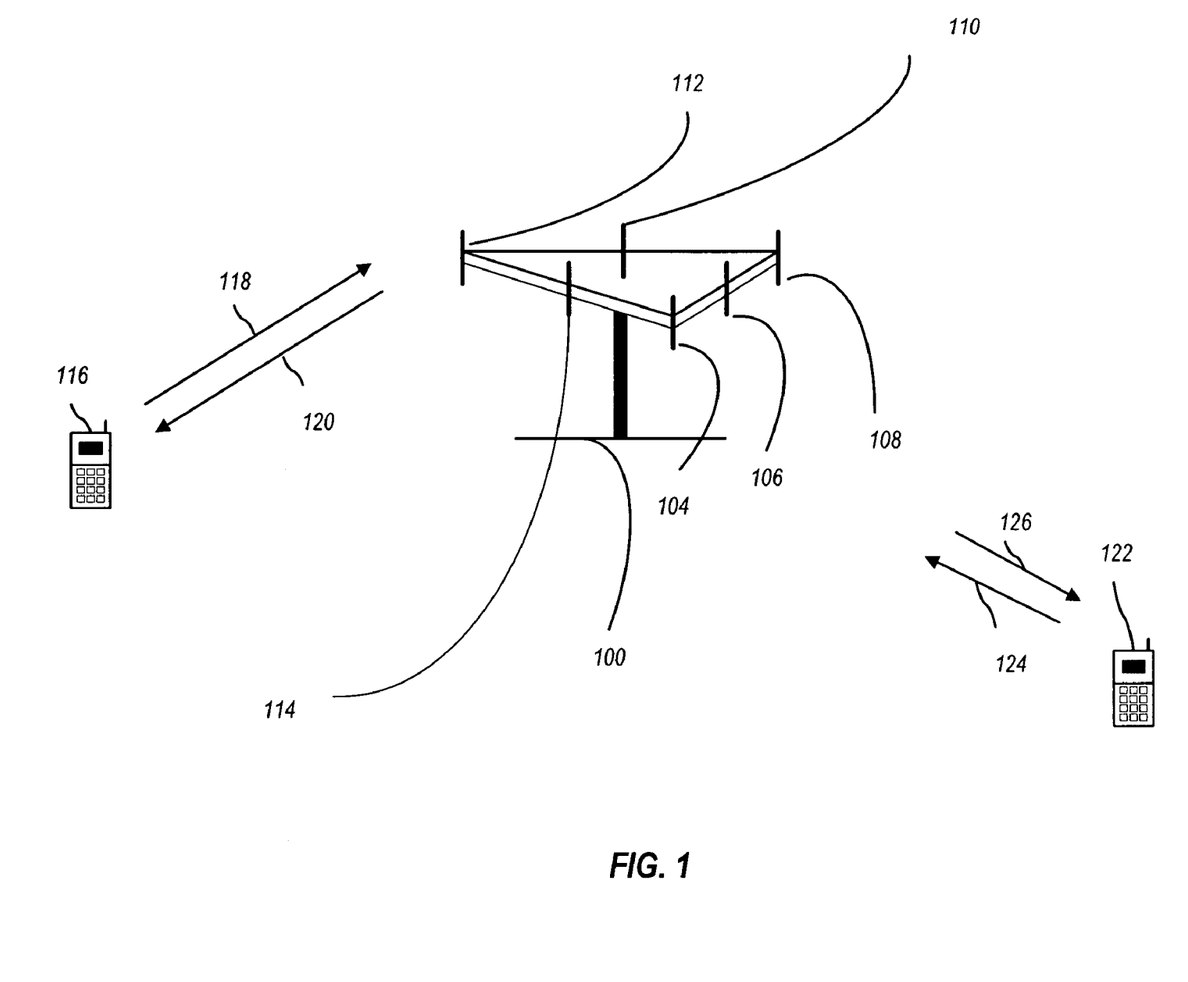
FIG. 1 illustrates a multiple access wireless communication system according to one embodiment.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118.

An access point may be a fixed station used for communicating with the terminals and may also be referred to as an access point, a Node B, or some other terminology. An access terminal (AT) may also be called an access terminal, user equipment (UE), a wireless communication device, terminal, access terminal or some other terminology.

Authentication of a device, e.g. an access terminal, ensures that only authorized devices, users, etc have access to a particular network. Authentication may refer to device authentication, service authentication, etc. In one example, multiple authentications may be required for a particular session. For instance, it may be required to authenticate both a device and a server for network access in a sector. Multiple authentications may be required, e.g. when an AT needs to perform access authentication to a radio access network provider and ISP authentication to the IP network provider. In another example, device and user authentications may be performed. Examples disclosed herein mitigate the possibility of an access terminal getting access without performing all necessary authentications.

In one example, when multiple authentications are required, e.g., two, a first key may be generated and used for encoding and decoding, a second key may then be generated, used to encode/decode and then the keys may be combined. In another example, serial authentication may be performed. In serial authentication, a first key may be generated in the first authentication, and then the second authentication may be performed using the key generated in the first authentication. In this example, it is not required to combine keys, and this may lead to simpler authentication implementation in communication systems.

Multiple authentications may be bound to each other where a temporal session key (TSK) from the latest authentication protects subsequent authentications. For instance, a TSK generated in a first authentication may be required in a second authentication. In another example, in the case of re-authentication, there may need to be only a single authentication.

Examples disclosed herein provide multiple authentication support. In one example, binding the authentications for security may be required. Here, access nodes or authenticators must allow the AT to get service only after all authentications have been successfully completed. In another example, efficient re-authentication is provided wherein multiple authentications do not need to be repeated.

Figure 3:
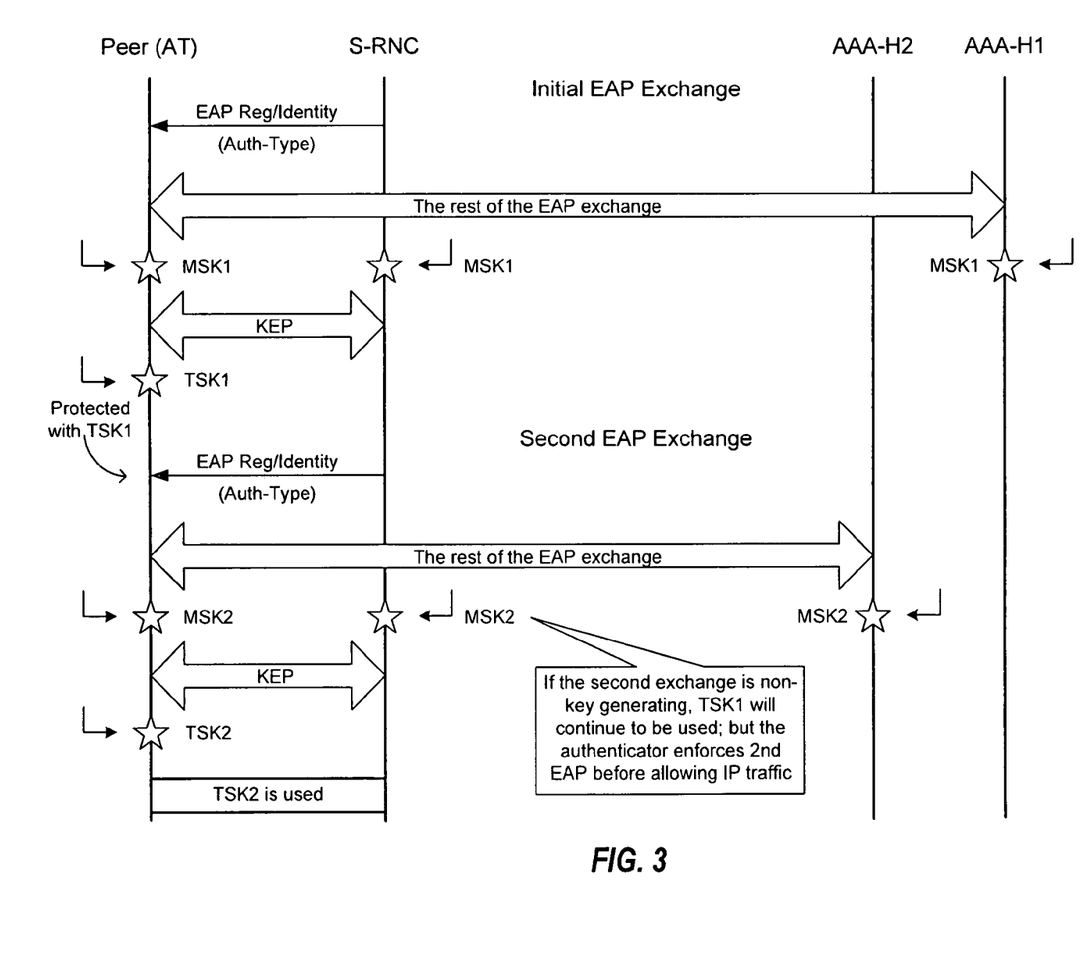
FIG. 3 illustrates an example of multiple authentications.

FIG. 3 illustrates an example of multiple authentications run one after another. As illustrated, the initial EAP exchange is done in the clear, for EAP Request/Identity (Auth-Type). Subsequently, the session is secured. In FIG. 3, the first authentication must be key generating. In other words, it is mandatory to generate a master session key (MSK), here, "MSK1." Subsequently, a key exchange protocol (KEP) generates a temporal session key (TSK), e.g. TSK1 from the MSK, as illustrated, MSK1. The TSK derived after the first authentication protects the second EAP authentication. If two or more authentications are key generating, the latest MSK becomes the current MSK. In one example, a second authentication may or may not generate a second MSK. If a second MSK is generated in the second authentication, the KEP uses the second MSK to generate a second TSK, e.g., TSK2. The second TSK may then be used for protection of subsequent messages (generated data). If a second MSK is not generated in the second authentication, the previously generated TSK, e.g. TSK1 may still be used.

Continuing with the example of FIG. 3, the serving radio network controller (S-RNC) forces KEP using the current MSK. S-RNC uses the ValidPMKExists flag to indicate to other active set members whether or not both authentications are complete. New active set members wait for session update with ValidPMKExists flag turned on before running ERP (EAP Re-authentication Protocol) and/or KEP (Air Interface Key Exchange Protocol). The ValidPMKExists flag may toggle between 1 and 0, wherein 1 indicates both sessions are complete and 0 represents they have not yet been completed. A session may comprise several authentications. For example a third authentication may be required. Here, a third MSK may be generated and used by the KEP to derive a third TSK. If a third MSK is not generated in the third authentication, a previous TSK may be used, e.g., TSK2, $TSK_{previous}$, etc.

New active set members may run ERP, but may then wait to run KEP until after the ValidPMKExists flag is turned on. In an example, if only one of the EAP methods is key generating an ERP exchange may be allowed for another eBS to go through using the DSRK established by the first EAP method. However, until the AT finishes all necessary authentications, the AT may not be allowed to access the network. Hence, the KEP exchange may be delayed until then. In another example, if more than one EAP method is key generating, ERP is also run using the last DSRK produced.

Figure 4:
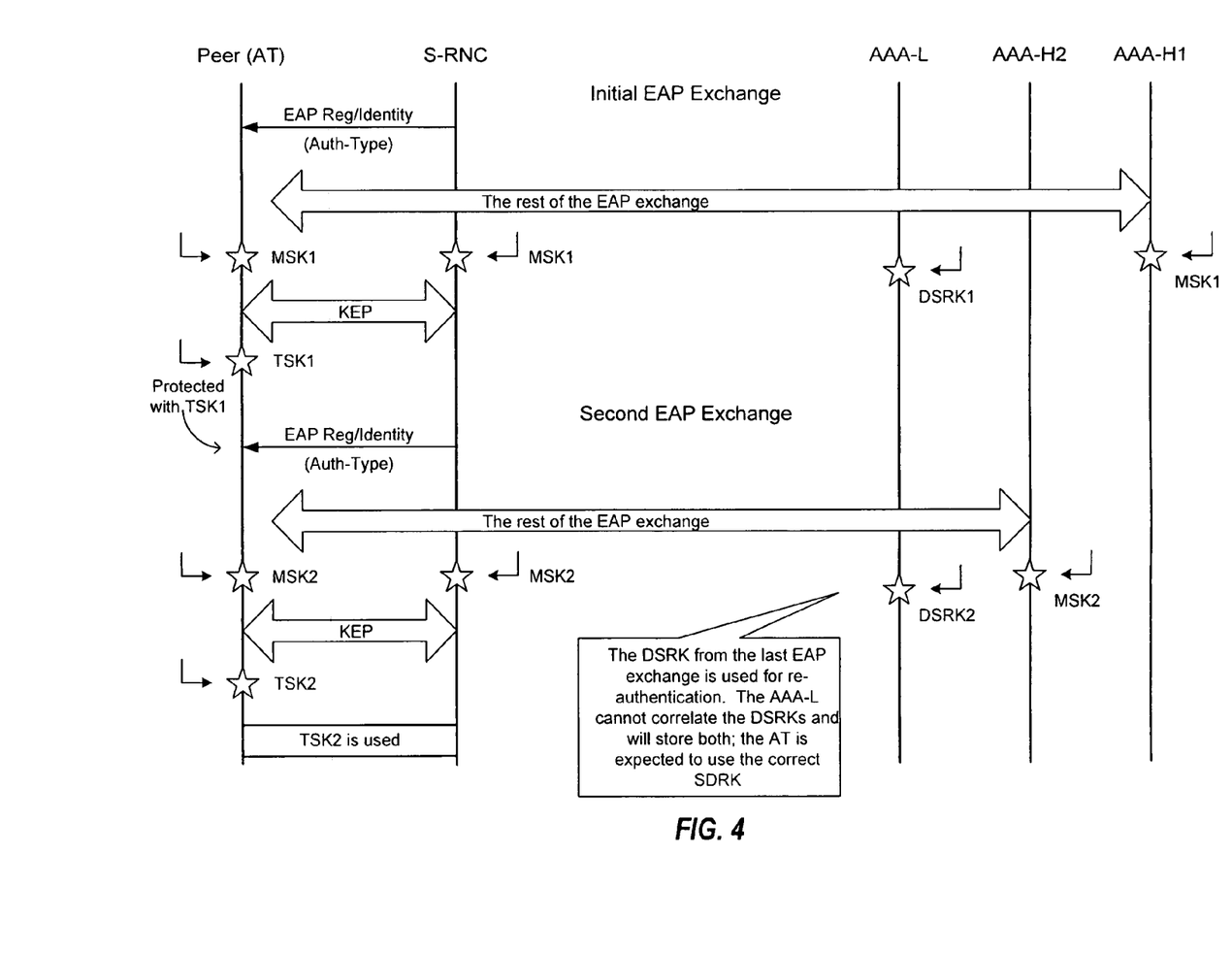
FIG. 4 illustrates an example of multiple authentications and DSRK usage.

FIG. 4 illustrates an example of multiple authentications and domain specific root key (DSRK) usage. DSRK may be used for re-authentication. As illustrated, DSRK from the last EAP exchange may be used for re-authentication. The AAA-L cannot correlate the DSRKs and stores both. The AT is expected to use the correct DSRK.

In another aspect, a misbehaving AT may finish first authentication with the S-RNC. It may also add an AN to the active set. Here, it may get session with MSK1' from S-RNC or do ERP with DSRK1. AAA-L does not know whether an AT has finished multiple authentications.

Mitigation may be at the air-interface level, or via backend network servers. At the air- interface level, S-RNC expects the AT to finish expected number of authentications. The S-RNC may give session to a new AN, but in the session there is ValidPMKExists flag which will indicate PMK is not yet established. The S-RNC may give session to any AN, since getsession cannot contain security cookie before EAP is complete. Here, S-RNC will make sure that session is updated after EAP (one or multiple) is complete. New AN will wait for another session update with this flag value toggled before performing ERP (Optional) and KEP. Further, new AN will not allow data transfer before TSK is established.

Via backend network servers, S-RNC expects the AT to finish expected number of authentications. If the AT finishes fewer than the expected number of authentications, the S-RNC may close the session or send a notification to the AAA-L holding the DSRK. Here, The AAA-L sends a notification to any ANs which may have derived rMSK from the DSRK. The ANs then close the unauthorized session with the AT.

With reference again to FIG. 1, each group of antennas and/or the area in which they are designed to communicate is often referred to as a sector of the access point. In the embodiment, antenna groups each are designed to communicate to access terminals in a sector, of the areas covered by access point 100.

Figure 2:
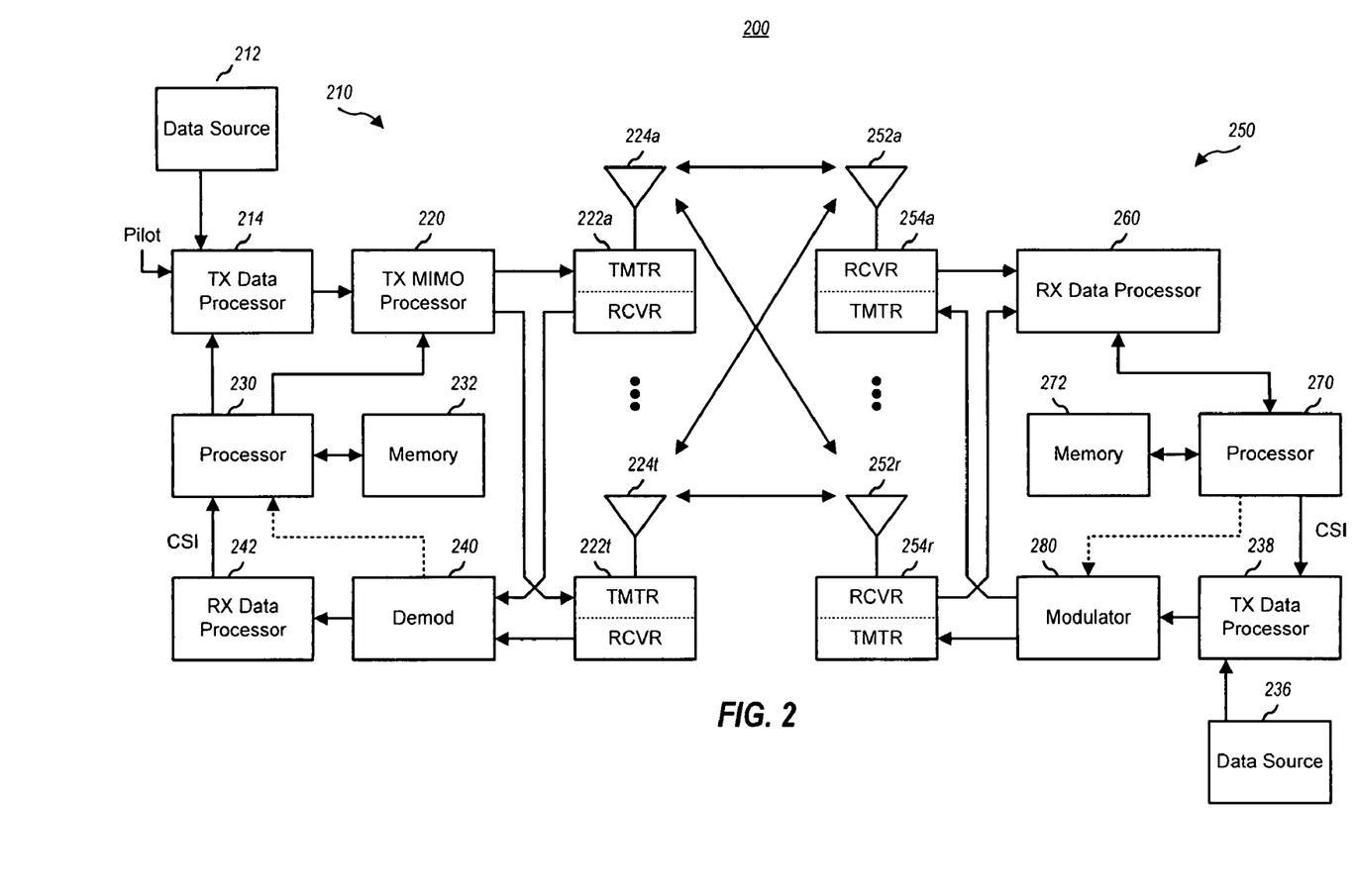
FIG. 2 a block diagram of a communication system.

FIG. 2 is a block diagram of an embodiment of a transmitter system 210 (also known as the access point) and a receiver system 250 (also known as access terminal) in a MIMO system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method for multiple Extensible Authentication Protocol (EAP)-based authentications in a wireless communication system, the method comprising:
   generating a first master session key (MSK) in a first EAP-based authentication for a first-type access;
   generating a first temporal session key (TSK) from the first master session key (MSK);
   performing a second EAP-based authentication, using the first temporal session key (TSK), for a second-type access;
   providing first-type access and second-type access after the first and second EAP-based authentications are successfully completed;
   generating a second master session key (MSK) in the second EAP-based authentication; and
   generating a second temporal session key (TSK) from the second master session key (MSK), wherein the second temporal session key (TSK) is used in a third EAP-based authentication.

2. A method for multiple Extensible Authentication Protocol (EAP)-based authentications in a wireless communication system, the method comprising:
   generating a first master session key (MSK) in a first EAP-based authentication for a first-type access;

generating a first temporal session key (TSK) from the first master session key (MSK);

performing a second EAP-based authentication, using the first temporal session key (TSK), for a second-type access;

providing first-type access and second-type access after the first and second EAP-based authentications are successfully completed; and using the first temporal session key (TSK) for a third EAP-based authentication if a second master session key (MSK) is not generated in the second EAP-based authentication.

3. The method for multiple EAP-based authentications as in claim 1, wherein the first and second EAP-based authentications are part of a single session.

4. The method for multiple EAP-based authentications as in claim 1, further comprising generating an indicator message to indicate if the first and second EAP-based authentications are successfully completed.

5. The method for multiple EAP-based authentications as in claim 4, wherein the indicator message has a value of 1 to indicate successful completion of the first and second EAP-based authentications, and a value of 0 to indicate the first and second EAP-based authentications have not been completed.

6. The method for multiple EAP-based authentications as in claim 5, wherein the indicator message is a ValidPMKExists flag.

7. The method for multiple EAP-based authentications as in claim 1, further comprising generating an indicator message to indicate if multiple EAP-based authentications are successfully completed.

8. The method for multiple EAP-based authentications as in claim 1, wherein the first EAP-based authentication includes an EAP Request/Identity message that includes a first authentication type, and the second EAP-based authentication includes an EAP Request/Identity message that includes a second authentication type.

9. A method for multiple Extensible Authentication Protocol (EAP)-based authentications in a wireless communication system, the method comprising:

generating a first master session key (MSK) in a first EAP-based authentication for a first-type access;

generating a first temporal session key (TSK) from the first master session key (MSK);

performing a second EAP-based authentication, using the first temporal session key (TSK), for a second-type access;

providing first-type access and second-type access after the first and second EAP-based authentications are successfully completed;

generating a first domain specific root key (DSRK) in the first EAP-based authentication;

generating a second domain specific root key (DSRK) in the second EAP-based authentication; and performing an EAP-based reauthentication of at least one of the first type access or the second type access using at least one of the first DSRK or the second DSRK.

10. The method for multiple EAP-based authentications as in claim 1, wherein the first-type access is associated with an access terminal (AT), and second-type access is associated with a user.

11. The method for multiple EAP-based authentications as in claim 1, wherein the first-type access comprises access to a radio network, and second-type access comprises access through an internet service provider (ISP).

12. The method for multiple EAP-based authentications as in claim 1, wherein the first-type access is associated with a particular device, and second-type access is associated with a particular server.

13. An apparatus for multiple Extensible Authentication Protocol (EAP)-based authentications operable in a wireless communication system, the apparatus comprising:

means for generating a first master session key (MSK) in a first EAP-based authentication for a first-type access;

means for generating a first temporal session key (TSK) from the first master session key (MSK);

means for performing a second EAP-based authentication, using the first temporal session key (TSK), for a second-type access;

means for providing first-type access and second-type access after the first and second EAP-based authentications are successfully completed;

means for generating a second master session key (MSK) in the second EAP-based authentication; and means for generating a second temporal session key (TSK) from the second master session key (MSK), wherein the second temporal session key (TSK) is used in a third EAP-based authentication.

14. An apparatus for multiple Extensible Authentication Protocol (EAP)-based authentications operable in a wireless communication system, the apparatus comprising:

means for generating a first master session key (MSK) in a first EAP-based authentication for a first-type access;

means for generating a first temporal session key (TSK) from the first master session key (MSK);

means for performing a second EAP-based authentication, using the first temporal session key (TSK), for a second-type access;

means for providing first-type access and second-type access after the first and second EAP-based authentications are successfully completed; and means for using the first temporal session key (TSK) for a third EAP-based authentication if a second master session key (MSK) is not generated in the second EAP-based authentication.

15. The apparatus for multiple EAP-based authentications as in claim 13, wherein the first and second EAP-based authentications are part of a single session.

16. The apparatus for multiple EAP-based authentications as in claim 13, further comprising means for generating an indicator message to indicate if the first and second EAP-based authentications are successfully completed.

17. The apparatus for multiple EAP-based authentications as in claim 16, wherein the indicator message has a value of 1 to indicate successful completion of the first and second EAP-based authentications, and a value of 0 to indicate the first and second EAP-based authentications have not been completed.

18. The apparatus for multiple EAP-based authentications as in claim 17, wherein the indicator message is a ValidPMKExists flag.

19. The apparatus for multiple EAP-based authentications as in claim 13, further comprising means for generating an indicator message to indicate if multiple EAP-based authentications are successfully completed.

20. The apparatus for multiple EAP-based authentications as in claim 13, wherein the first EAP-based authentication includes an EAP Request/Identity message that includes a first authentication type, and the second EAP-based authentication includes an EAP Request/Identity message that includes a second authentication type.

21. An apparatus for multiple Extensible Authentication Protocol (EAP)-based authentications operable in a wireless communication system, the apparatus comprising:
- means for generating a first master session key (MSK) in a first EAP-based authentication for a first-type access;
- means for generating a first temporal session key (TSK) from the first master session key (MSK);
- means for performing a second EAP-based authentication, using the first temporal session key (TSK), for a second-type access;
- means for providing first-type access and second-type access after the first and second EAP-based authentications are successfully completed;
- means for generating a first domain specific root key (DSRK) in the first EAP-based authentication;
- means for generating a second domain specific root key (DSRK) in the second EAP-based authentication; and
- means for performing an EAP-based reauthentication of at least one of the first type access or the second type access using at least one of the first DSRK or the second DSRK.

22. The apparatus for multiple EAP-based authentications as in claim 13, wherein the first-type access is associated with an access terminal (AT), and second-type access is associated with a user.

23. The apparatus for multiple EAP-based authentications as in claim 13, wherein the first-type access comprises access to a radio network, and second-type access comprises access through an internet service provider (ISP).

24. The apparatus for multiple EAP-based authentications as in claim 13, wherein the first-type access is associated with a particular device, and second-type access is associated with a particular server.

25. A computer program product, comprising:
non-transitory computer-readable medium, comprising:
- code for causing a computer to generate a first master session key (MSK) in a first Extensible Authentication Protocol (EAP)-based authentication for a first-type access;
- code for causing a computer to generate a first temporal session key (TSK) from the first master session key (MSK);
- code for causing a computer to perform a second EAP-based authentication, using the first temporal session key (TSK), for a second-type access;
- code for causing a computer to provide first-type access and second-type access after the first and second EAP-based authentications are successfully completed;
- code for causing a computer to generate a second master session key (MSK) in the second EAP-based authentication; and
- code for causing a computer to generate a second temporal session key (TSK) from the second master session key (MSK), wherein the second temporal session key (TSK) is used in a third EAP-based authentication.

26. A computer program product comprising:
non-transitory computer-readable medium, comprising:
- code for causing a computer to generate a first master session key (MSK) in a first Extensible Authentication Protocol (EAP)-based authentication for a first-type access;
- code for causing a computer to generate a first temporal session key (TSK) from the first master session key (MSK);
- code for causing a computer to perform a second EAP-based authentication, using the first temporal session key (TSK), for a second-type access;
- code for causing a computer to provide first-type access and second-type access after the first and second EAP-based authentications are successfully completed; and
- code for causing a computer to use the first temporal session key (TSK) for a third EAP-based authentication if a second master session key (MSK) is not generated in the second EAP-based authentication.

27. The computer program product as in claim 25, wherein the first and second EAP-based authentications are part of a single session.

28. The computer program product as in claim 25, further comprising code for causing a computer to generate an indicator message to indicate if the first and second EAP-based authentications are successfully completed.

29. The computer program product as in claim 28, wherein the indicator message has a value of 1 to indicate successful completion of the first and second EAP-based authentications, and a value of 0 to indicate the first and second EAP-based authentications have not been completed.

30. The computer program product as in claim 29, wherein the indicator message is a ValidPMKExists flag.

31. The computer program product as in claim 25, further comprising code for causing a computer to generate an indicator message to indicate if multiple EAP-based authentications are successfully completed.

32. The computer program product as in claim 25, wherein the first EAP-based authentication includes an EAP Request/Identity message that includes a first authentication type, and the second EAP-based authentication includes an EAP Request/Identity message that includes a second authentication type.

33. The A computer program product comprising:
non-transitory computer-readable medium, comprising:
- code for causing a computer to generate a first master session key (MSK) in a first Extensible Authentication Protocol (EAP)-based authentication for a first-type access;
- code for causing a computer to generate a first temporal session key (TSK) from the first master session key (MSK);
- code for causing a computer to perform a second EAP-based authentication, using the first temporal session key (TSK), for a second-type access;
- code for causing a computer to provide first-type access and second-type access after the first and second EAP-based authentications are successfully completed;
- code for causing a computer to generate a first domain specific root key (DSRK) in the first EAP-based authentication;
- code for causing a computer to generate a second domain specific root key (DSRK) in the second EAP-based authentication; and
- code for causing a computer to perform an EAP-based reauthentication of at least one of the first type access or the second type access using at least one of the first DSRK or the second DSRK.

34. The computer program product as in claim 25, wherein the first-type access is associated with an access terminal (AT), and second-type access is associated with a user.

35. The computer program product as in claim 25, wherein the first-type access comprises access to a radio network, and second-type access comprises access through an internet service provider (ISP).

36. The computer program product as in claim 25, wherein the first-type access is associated with a particular device, and second-type access is associated with a particular server.

37. An apparatus for multiple Extensible Authentication Protocol (EAP)-based authentications operable in a wireless communication system, the apparatus comprising:
a processor, configured to:
generate a first master session key (MSK) in a first EAP-based authentication for a first-type access,
generate a first temporal session key (TSK) from the first master session key (MSK),
perform a second EAP-based authentication, using the first temporal session key (TSK), for a second-type access,
provide first-type access and second-type access after the first and second EAP-based authentications are successfully completed,
generate a second master session key (MSK) in the second EAP-based authentication, and
generate a second temporal session key (TSK) from the second master session key (MSK), wherein the second temporal session key (TSK) is used in a third EAP-based authentication: and
a memory coupled to the processor for storing data.

38. An apparatus for multiple Extensible Authentication Protocol (EAP)-based authentications operable in a wireless communication system, the apparatus comprising:
a processor, configured to:
generate a first master session key (MSK) in a first EAP-based authentication for a first-type access,
generate a first temporal session key (TSK) from the first master session key (MSK),
perform a second EAP-based authentication, using the first temporal session key (TSK), for a second-type access,
provide first-type access and second-type access after the first and second EAP-based authentications are successfully completed, and
use the first temporal session key (TSK) for a third EAP-based authentication if a second master session key (MSK) is not generated in the second EAP-based authentication; and
a memory coupled to the processor for storing data.

39. The apparatus for multiple EAP-based authentications as in claim 37, wherein the first and second EAP-based authentications are part of a single session.

40. The apparatus for multiple EAP-based authentications as in claim 37, the processor further being, configured to generate an indicator message to indicate if the first and second EAP-based authentications are successfully completed.

41. The apparatus for multiple EAP-based authentications as in claim 40, wherein the indicator message has a value of 1 to indicate successful completion of the first and second EAP-based authentications, and a value of 0 to indicate the first and second EAP-based authentications have not been completed.

42. The apparatus for multiple EAP-based authentications as in claim 41, wherein the indicator message is a ValidPMKExists flag.

43. The apparatus for multiple EAP-based authentications as in claim 37, the processor further being, configured to generate an indicator message to indicate if multiple EAP-based authentications are successfully completed.

44. The apparatus for multiple EAP-based authentications as in claim 37, wherein the first EAP-based authentication includes an EAP Request/Identity message that includes a first authentication type, and the second EAP-based authentication includes an EAP Request/Identity message that includes a second authentication type.

45. An apparatus for multiple Extensible Authentication Protocol (EAP)-based authentications operable in a wireless communication system, the apparatus comprising:
a processor configured to:
generate a first master session key (MSK) in a first EAP-based authentication for a first-type access,
generate a first temporal session key (TSK) from the first master session key (MSK),
perform a second EAP-based authentication, using the first temporal session key (TSK), for a second-type access,
provide first-type access and second-type access after the first and second EAP-based authentications are successfully completed,
generate a first domain specific root key (DSRK) in the first EAP-based authentication,
generate a second domain specific root key (DSRK) in the second EAP-based authentication, and
perform an EAP-based reauthentication of at least one of the first type access or the second type access using at least one of the first DSRK or the second DSRK; and
a memory coupled to the processor for storing data.

46. The apparatus for multiple EAP-based authentications as in claim 37, wherein the first-type access is associated with an access terminal (AT), and second-type access is associated with a user.

47. The apparatus for multiple EAP-based authentications as in claim 37, wherein the first-type access comprises access to a radio network, and second-type access comprises access through an internet service provider (ISP).

48. The apparatus for multiple EAP-based authentications as in claim 37, wherein the first-type access is associated with a particular device, and second-type access is associated with a particular server.

* * * * *